(12) United States Patent
Fleury et al.

(10) Patent No.: US 9,544,273 B2
(45) Date of Patent: Jan. 10, 2017

(54) NETWORK TRAFFIC PROCESSING SYSTEM

(75) Inventors: Damon E. Fleury, Cedar Park, TX (US); James M. Rolette, Round Rock, TX (US)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 14/418,881

(22) PCT Filed: Jul. 31, 2012

(86) PCT No.: PCT/US2012/049036
§ 371 (c)(1),
(2), (4) Date: Jan. 30, 2015

(87) PCT Pub. No.: WO2014/021863
PCT Pub. Date: Feb. 6, 2014

(65) Prior Publication Data
US 2015/0215285 A1 Jul. 30, 2015

(51) Int. Cl.
*H04L 29/06* (2006.01)
*H04L 29/08* (2006.01)

(52) U.S. Cl.
CPC ........... *H04L 63/0254* (2013.01); *H04L 63/12* (2013.01); *H04L 63/1416* (2013.01); *H04L 67/10* (2013.01); *H04L 69/12* (2013.01); *H04L 69/22* (2013.01)

(58) Field of Classification Search
CPC ................................................. H04L 63/0254
See application file for complete search history.

(56) References Cited

U.S. PATENT DOCUMENTS

| 6,904,519 B2 * | 6/2005 | Anand ............... G06F 9/5027 709/203 |
| 7,134,143 B2 | 11/2006 | Stellenberg et al. |
| 7,773,516 B2 | 8/2010 | Cox et al. |
| 8,140,662 B2 | 3/2012 | Curran-Gray et al. |
| 8,756,337 B1 * | 6/2014 | Canion ................. H04L 63/145 370/237 |

(Continued)

FOREIGN PATENT DOCUMENTS

| JP | 2005-229573 A | 8/2005 |
| JP | 2010-268483 A | 11/2010 |

(Continued)

OTHER PUBLICATIONS

International Searching Authority, PCT/US2012/049036 filed Jul. 31, 2012, Search Report and Written Opinion Aug. 12, 2013.

(Continued)

*Primary Examiner* — Saleh Najjar
*Assistant Examiner* — Simon Kanaan
(74) *Attorney, Agent, or Firm* — Okamoto & Benedicto LLP

(57) ABSTRACT

A system for processing network traffic includes a hardware-accelerated inspection unit to process network traffic in hardware-accelerated inspection mode, and a software inspection unit to process the network traffic in software inspection mode. The software inspection unit processes a connection in in the software inspection mode at least for a consecutive predetermined number of bytes of the connection. The connection may be transitioned to the hardware-accelerated inspection mode if the connection is determined to be clean.

12 Claims, 5 Drawing Sheets

(56) References Cited

U.S. PATENT DOCUMENTS

| | | | |
|---|---|---|---|
| 8,839,405 B2* | 9/2014 | Sutardja | H04L 12/2878 726/13 |
| 2003/0105975 A1* | 6/2003 | Nagoya | G06F 21/567 726/24 |
| 2005/0182950 A1 | 8/2005 | Son et al. | |
| 2006/0288096 A1 | 12/2006 | Yim | |
| 2007/0266433 A1* | 11/2007 | Moore | G06F 21/53 726/15 |
| 2010/0058459 A1 | 3/2010 | Li et al. | |
| 2012/0005755 A1* | 1/2012 | Kitazawa | G06F 21/56 726/24 |
| 2015/0128246 A1* | 5/2015 | Feghali | H04L 63/0209 726/13 |

FOREIGN PATENT DOCUMENTS

| | | |
|---|---|---|
| KR | 10-2007-0119382 | 12/2007 |
| KR | 10-2010-0055147 | 5/2010 |
| TW | 201010354 A | 3/2010 |

OTHER PUBLICATIONS

Jose M Gonzalez et al., Shunting: a hardware/software architecture for flexible, high-performance network intrusion prevention', ACM Conference on Computer and Communications Security—CCS, pp. 139-149, 2007. 11.02 "http://www.icir.org/vern/papers/shunting.ccs07.pdf" See sections 3.1-3.2; and f igure 1.

Pontarelli, S. et al.,Exploiting Dynamic Reconfiguration for FPGA Based Network Intrusion Detection Systems,<http://64.238.147.56/citation.cfm?id=1933303.1933737&coll=DL&dl=GUIDE&CFID=91254411&CFTOKEN=61701411 > on pp. 10-14, 2010.

Wang, X. et al., Towards High-performance Network Intrusion Prevention System on Multi-core Network Services Processor, <http://ieeexplore.ieee.org/stamp/stamp.jsp?arnumber=5395257 > on pp. 220-227, Dec. 8-11, 2009.

Supplementary European Search Report, European Patent Application No. 12882301.0, Feb. 8, 2016, 9 pages.

* cited by examiner

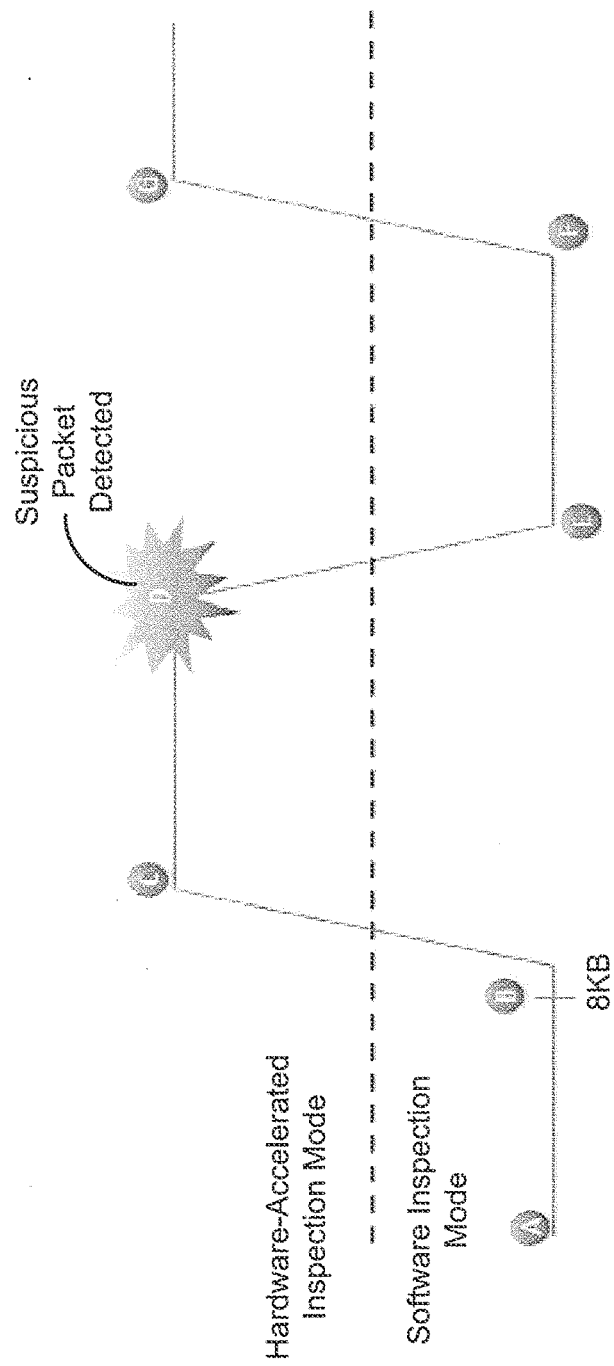

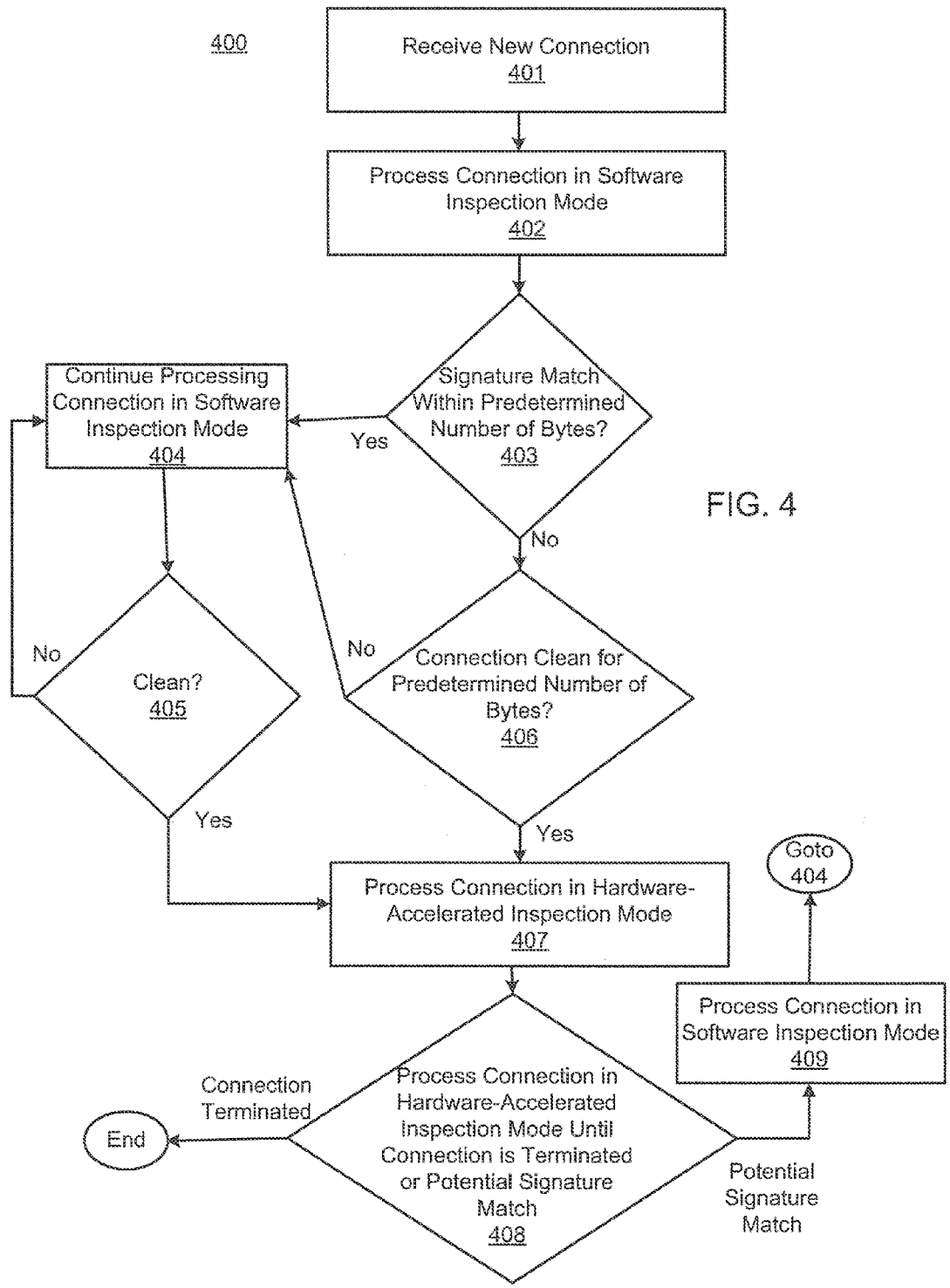

NETWORK TRAFFIC PROCESSING SYSTEM

BACKGROUND

It has been suggested that Internet traffic is expected to quadruple by the year 2015. Furthermore, reports have shown that global average connection rates have increased 43% year-over-year and global average peak rates increased 67% year-over-year. Concurrently, the sophistication of internal and external network attacks in the form of viruses, worms and malware of all sorts has increased dramatically.

Network administrators continue to be tasked with providing network security and they often rely on various systems for network security. For example, Intrusion Detection Systems (IDSs) detect network attacks, but some operate as passive systems that do not offer much more than after-the-fact attack notification. In contrast, Intrusion Prevention Systems (IPSs) have been developed to complement traditional security products such as firewalls by proactively analyzing network traffic flows by scanning incoming and outgoing traffic. However, deep packet inspection by IPSs typically utilize a significant amount of resources and can become a network bottleneck if their performance does not keep up with increasing connection rates and throughput bandwidth.

BRIEF DESCRIPTION OF DRAWINGS

The embodiments are described in detail h reference to the examples shown in the following figures:

FIGS. 3 and 4 illustrate processing network traffic.

DETAILED DESCRIPTION OF EMBODIMENTS

Figure 1:
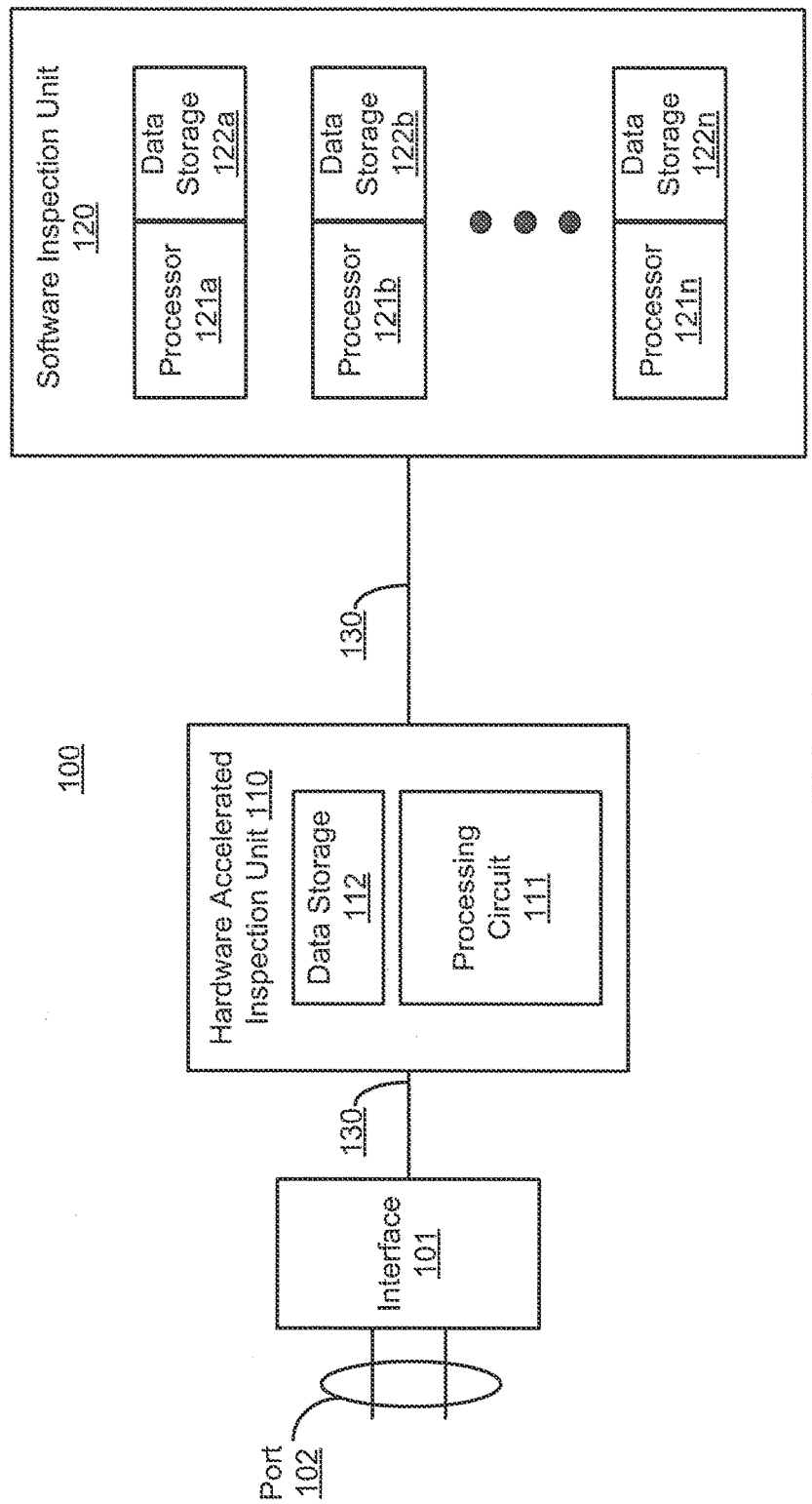
FIG. 1 illustrates a network traffic processing system.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

According to an embodiment, a system for processing network traffic inspects network traffic to identify potential signature matches. The network traffic that is considered to have potential signature matches is further inspected to determine if it has a signature match. If a signature match is detected, the network traffic may be blocked, reported, rate-limited or other remedial actions may be taken.

The system includes a hardware-accelerated inspection unit, such as Field-Programmable Gate Arrays (FPGAs), an Application-Specific Integrated Circuit (ASIC), or another type of customizable integrated circuit or processor, performing hardware-accelerated inspection of packets, and the system includes a software inspection unit comprised of machine readable instructions executed by a processor or some type of a processing circuit to perform software inspection of packets. The hardware-accelerated inspection unit is faster at performing its inspection than the software inspection unit and the system leverages the hardware-accelerated inspection unit to improve inspection processing speed. For example, at the start of a connection, packet inspection is performed by the software inspection unit. A connection includes packets that have the same attributes. Examples of the attributes may include source Internet Protocol (IP) address, destination IP address, source IP port, destination IP port, IP protocol, etc. In one example, a connection is a Transmission Control Protocol (TCP) flow. In another example, a connection is a pseudoflow which includes packets having the same attributes. For example, a connection may be a pseudoflow in the User Datagram Protocol (UDP) or another protocol that does not require prior communications to setup a transmission channel or a datapath. If an attack is not detected by the time the connection reaches a threshold number of bits (e.g., 8 kilobytes (KB)), the software inspection unit instructs the hardware-accelerated inspection unit to place the flow into hardware-accelerated inspection mode to improve performance.

In the hardware-accelerated inspection mode, the connection is inspected by the hardware-accelerated inspection unit at a faster rate than is possible with the software inspection unit. The processing performed by the hardware-accelerated inspection unit may be two or three times faster than the processing performed by the software inspection unit. In the hardware-accelerated inspection mode, if the connection is clean, such as determined not to have a potential signature match, the packets for the connection are transmitted without software inspection performed on the packets. In hardware-accelerated inspection mode the packets for a connection are processed by the hardware-accelerated inspection unit but are not processed by the software inspection unit to minimize processing time. However, if the hardware-accelerated inspection unit detects a potential signature match in a connection, the connection is transferred to software inspection mode for further processing by the software inspection unit to determine if there is a signature match. In the software inspection mode the connection is processed by the software inspection unit and is also processed by the hardware-accelerated inspection unit. By transitioning the inspection of the connection between hardware-accelerated inspection mode and software inspection mode, throughput is increased while maintaining security.

The software inspection unit performs packet inspection, which may include a more detailed packet inspection and filtering than performed in hardware inspection mode. Thus the packet processing performed by the hardware-accelerated inspection unit may be different than the packet inspection performed by the software inspection unit. For example, the packet processing performed by the software inspection unit includes deep packet inspection. Deep packet inspection includes inspecting payloads as well as headers of packets in a connection. Deep packet inspection may comprise inspecting data from the connection in all seven Open Systems Interconnection (OSI) layers. The packet processing performed by the hardware-accelerated inspection unit may not include data from all seven OSI layers. For example, the packet inspection may be limited to headers.

A connection that has a potential signature match is a connection that is determined to have specific predefined attributes. For example, a connection may include a packet or multiple packets that have attributes representative of a security threat. For example, packets in a connection are inspected by the hardware-accelerated inspection unit to determine if they are out of order, or are fragmented or if they have a certain byte pattern in their payload A connection may have a potential signature match also if it includes data determined to be of interest based on a policy or a rule. For example, a rule specifies to monitor packets for particular applications. If a connection includes packets from any of those applications, it is considered a signature match based on the rule. For example, packets from an instant messaging application are monitored and may be blocked by the system from leaving a local area network (LAN).

Similar to a potential signature match, a connection may be determined to have a signature match if it has predetermined attributes, however, the attributes are identified by the software inspection unit rather than the hardware-accelerated inspection unit. The attributes for the signature match may be different than the attributes for the potential signature match. The attributes for the signature match may be identified by deep packet inspection. A signature match may include a match determined by regular expression matching and/or other filtering and packet signature detection techniques to detect additional information about the packet and its data that may indicate it is malicious or otherwise of interest. Malicious attributes may be representative of phishing attacks, attempted spyware installation, packet flooding that can consume network bandwidth or server resources causing legitimate packets to be dropped, etc.

The system for processing network traffic may comprise an IPS that is connected to a network. The IPS inspects the connection and the connection may be flagged, blocked and/or discarded if it is found to have a signature match. Logs are kept and alarms or other notifications may be generated and may be sent to a system administrator as a result of a signature match. If the connection is clean, then the IPS outputs the connection to be transmitted to its destination.

FIG. 1 illustrates a system 100 for processing network traffic. The system 100 may comprise an IPS that blocks network traffic determined to have a signature match. The system 100 includes an interface 101 including ports 102. The interface 101 is a network interface connecting the system 100 to a network. Packets are sent and received on the ports 102 of the interface 101.

The system 100 includes a hardware-accelerated inspection unit 110 and a software inspection unit 120. The components of the system 100 may be connected via a bus 130. The software inspection unit 120 may comprise one or more processors 121a-n including data storage 122a-n comprised of a computer readable storage medium operable to store machine readable instructions and data. The machine readable instructions may include code to perform connection processing functions described herein. The hardware-accelerated unit 110 includes processing circuit 111, such as FPGAs, an ASIC, or another type of customizable integrated circuit or hardware that also performs connection processing but at an accelerated rate when compared to the software inspection unit 120. The hardware-accelerated unit 110 may also include data storage 112.

The hardware-accelerated inspection unit 110 and the software inspection unit 120 process a connection received from the network to determine if the connection has potential signature matches. This is referred to as inspection. If connection is determined to have a signature match, the connection may be blocked from being sent to its destination. The connection may be flagged and discarded by the system 100. A connection that is determined to be clean is transmitted via the interface 101 to its destination. A clean connection is a connection that does not have a potential signature match and/or a signature match.

The hardware-accelerated inspection unit 110 and the software inspection unit 120 may be configured for inline processing. For example, a connection received by the interface 101 is processed first by the hardware-accelerated inspection unit 110 and then may be processed by the software inspection unit 120. If the connection is determined to be clean it is sent via the interface 101 to its destination.

The system 100 may switch between hardware-accelerated inspection mode, where a connection is inspected by the hardware-accelerated inspection unit but is not processed by the software inspection unit 120, and a software inspection mode where the connection is processed by the software inspection unit and may also be processed by the hardware-accelerated inspection unit, such as in the inline configuration where the connection is first processed by the hardware-accelerated inspection unit 110 and then may be processed by the software inspection unit 120.

The system 100 may be a standalone network appliance that may be connected to a router or a firewall or a network in general to receive and inspect packets and to send out clean packets. The system 100 may be incorporated in an existing network appliance, such as a router, firewall, or another type of switch. The system 100 may be in a multifunction, converged security appliance, such as an IPS and a firewall in a single device. The system 100 may be in a blade chassis, or another type of appliance.

Figure 2A:
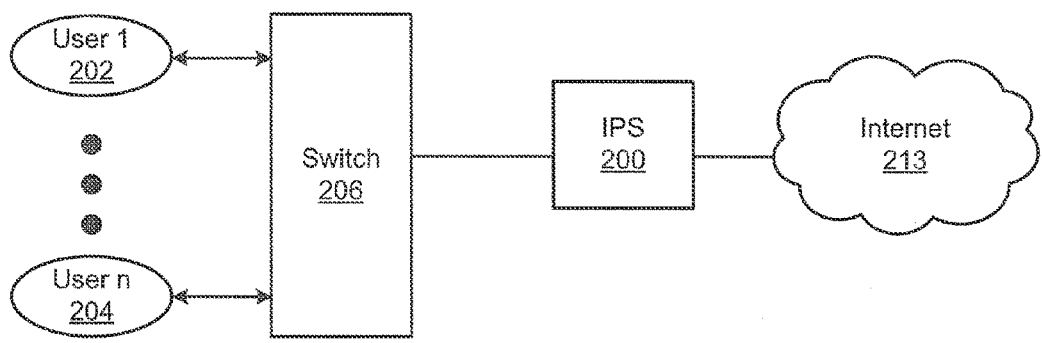
FIGS. 2A-B illustrate the network traffic processing system in different network environments.
Figure 2B:
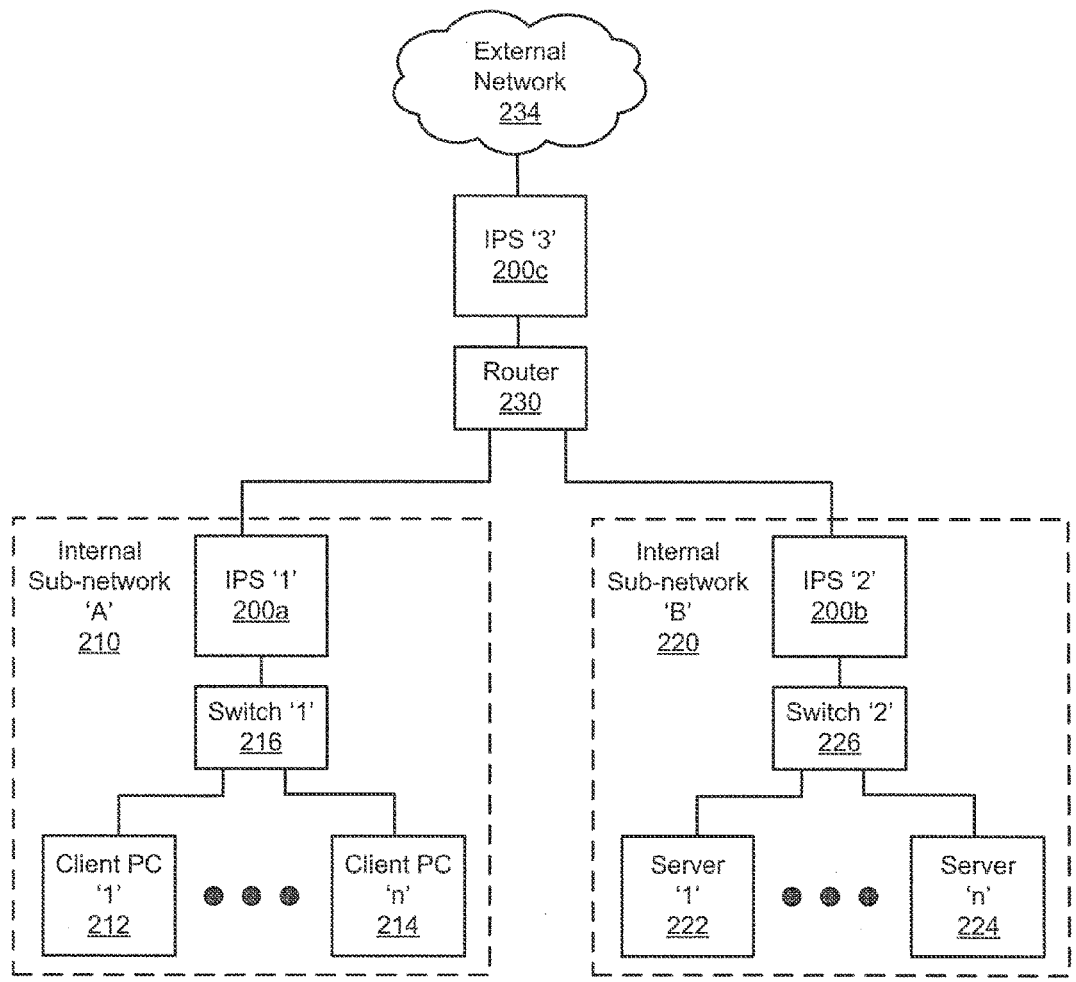

FIGS. 2A-B shows the system 100, which may be an IPS 200, connected in different network environments. FIG. 2A shows the IPS 200 connected in a "bump-in-the-wire" configuration. User '1' 202 through user 'n' 204 are connected to switch 206, which is connected to IPS 200, which in turn is connected to the Internet 213 or a network backbone. IPS 200 is commonly implemented between a switch and a network to prevent security threats from being received from, or transmitted to, the Internet 213 or a network backbone.

FIG. 2B shows IPSs 200a-c implemented in another network environment. In this figure, internal sub-network 'A' 210 is comprised of client personal computer (PC) '1' 212 through client PC 'n' 214, connected to switch '1' 216, which in turn is connected to IPS '1' 200a. Internal sub-network 'B' 220 is comprised of server '1' 222 through server 'n' 224, connected to switch '2' 226, which in turn is connected to IPS '2' 200b. Internal sub-network 'A' 210 and internal sub-network 'B' 220 are connected to router 230, which is connected to IPS '3' 200c, which in turn is connected to external network 234. IPS '3' 200c is commonly implemented to prevent the intrusion of security threats into internal sub-network 'A' 210 and internal sub-network 'B' 220 from external network 234.

IPS '1' 200a provides additional intrusion protection by preventing the intrusion of security threats originating from internal sub-network 'A' 210. Likewise, IPS '2' 200b provides additional intrusion protection by preventing the intrusion of security threats originating from internal sub-network 'B' 220. As will be apparent to skilled practitioners of the art, the implementation of IPS '1' 200a isolates intrusion issues to internal sub-network 210, comprised of one or more client PCs 212 through 214 and corresponding switch '1' 216. Similarly, the implementation of IPS '2' 200b isolates intrusion issues to internal sub-network 220, comprised of one or more servers 222 through 224 and corresponding switch '1' 226.

FIG. 3 shows an example of connection processing switching between hardware-accelerated inspection mode and software inspection mode over time. At the start of a connection, the connection is processed in software inspection mode by the software inspection unit 120 shown in FIG. 1. The connection is processed in software inspection mode for at least a predetermined number of bytes until point B. Processing the connection in software inspection mode is continued past the threshold (e.g., 8 KB) if the connection is determined to have a potential signature match. The example shows 8 KB but the threshold may be larger or smaller.

If the connection is "clean" up to point B, the processing of the connection transitions from software inspection mode to hardware-accelerated inspection mode from points B to C and remains in hardware-accelerated inspection mode where packets are processed at a much faster rate than the software inspection mode until the connection is determined to have a potential signature match by the hardware-accelerated inspection unit 110, such as at point D. Then, the processing of the connection transitions to software inspection mode for additional inspection which may include deep packet inspection, from points D to E, and remains in the software inspection mode until the connection is determined to be "clean". If the connection is "clean", then the processing may again transition from points F to G to hardware-accelerated inspection mode for maximum performance. The connection processing transitions may continue to occur for the life of the connection. Connections are processed separately, so different connections may have different connection processing transitions depending on if and when potential signature matches or signature matches are detected in the connections.

FIG. 4 shows an example of a method 400 for processing network traffic. The method 400 is described with respect to the system 100 by way of example and not limitation. The method may be practiced in other systems.

At 401, the system receives a new connection. The new connection may be identified by attributes that define the connection and an entry may be created in a connection table stored at the hardware-accelerated inspection unit 110 and/or at the software inspection unit 120 shown in FIG. 1 that includes a connection ID and connection attributes and an indication of the current mode for the connection. The current mode is either the hardware-accelerated mode or the software inspection mode. A new connection starts out as being processed in software inspection mode.

At 402, the connection is processed in software inspection mode for at least a predetermined number of bytes. For example, the connection is processed by the hardware-accelerated inspection unit 110 and the connection is sent to the software inspection unit 120 from the hardware-accelerated inspection unit 110 for further processing at least until a threshold number of bytes are reached. The hardware-accelerated inspection unit 110 may indicate in its connection table that the connection is in software inspection mode.

At 403, while the connection is being processed in software inspection mode for at least the predetermined bytes, a determination is made as to whether the connection has a potential signature match by the software inspection unit 120. If yes, packet processing for the connection continues in software inspection mode at 404. The connection processing continues in software inspection mode until the connection is determined to be clean at 405. If the connection is clean, then connection processing transitions to hardware-accelerated inspection mode at 407. If connection processing is not clean, then connection processing in software inspection mode is continued at 404. For example, if a signature match is detected, connection processing in software inspection mode is continued at 404. For example, if malicious packets are detected through a signature match and the connection is blocked, connection processing in software inspection mode is continued. The connection processing transitions to the hardware-accelerated mode until the connection is clean. If the connection is clean and it is clean for the predetermined number of bytes at 406, the connection processing is transitioned to hardware-accelerated inspection mode at 407. For example, the software inspection unit 120 instructs the hardware-accelerated inspection unit 110 to place the connection in hardware-accelerated inspection mode. For example, the hardware-accelerated inspection unit 110 updates its connection table to indicate the connection is now in hardware-accelerated inspection mode.

At 408, the connection is processed in hardware-accelerated inspection mode, for example, by the hardware-accelerated inspection unit 110 until the connection is terminated or until the connection is determined to have a potential signature match by the hardware-accelerated inspection unit 110. If the connection is determined to have a potential signature match, then processing is transitioned to software inspection mode at and the connection is processed in software inspection mode at 409 and processing may continue at 404. The hardware-accelerated inspection unit 110 may then update its connection table to indicate the connection is in software inspection mode so if any packets are received on the interface 101 for the connection, the hardware-accelerated inspection unit 110 knows to send the packets after processing to the software inspection unit 110.

If the connection table in the hardware-accelerated inspection unit 110 indicates that a connection is in hardware-accelerated inspection mode, then the hardware-accelerated inspection unit knows not to send the packets to the software inspection unit 120 if the hardware-accelerated inspection unit 110 determines the connection is clean. The connection may be determined to be clean if it is determined to be uninteresting based on policy rules. Instead the packets are sent out via the interface 110. Also, if information is identified by the hardware-accelerated inspection unit 110 that a packet is suspicious, such as whether the packet is out of order, has a suspicious byte pattern or some other attribute indicating it is malicious or of interest, that information may be sent to the software inspection unit 120 to aid in the packet inspection performed by the software inspection unit 120. Other information may be communicated between the software inspection unit 120 and the hardware-accelerated inspection unit 110, such as an indication of the processing mode or an instruction to transition to a different mode.

Also, if a packet is determined to be malicious or of interest by the software inspection unit 120, the system 100 may block the connection and not send the suspicious packet or any other packets for the connection. The system 100 may discard the packets if the software inspection unit 120 determines a packet or set of packets for the connection are malicious or of interest. Also, a log file may be updated regarding the event and notifications sent about the event.

One or more of the steps and functions described herein may be embodied as machine readable instruction executed by a processor or another type of processing circuit operable to execute machine readable instructions. The machine readable instructions may be stored in a non-transitory storage medium, which may include one or more of the storage devices shown in FIG. 1.

While the embodiments have been described with reference to examples, various modifications to the described embodiments may be made without departing from the scope of the claimed embodiments.

What is claimed is:

1. A system for processing network traffic in a computer network, the system comprising:
   a hardware-accelerated inspection unit to process the network traffic in hardware-accelerated inspection mode, the hardware-accelerated unit comprising an integrated circuit that is customized to inspect the network traffic for signatures; and a software inspection unit to process the network traffic in software inspection mode, the software inspection unit comprising a processor that executes instructions in memory to inspect the network traffic for signatures, wherein the software inspection unit processes a connection in the network traffic in the software inspection mode to detect a signature match, and if the connection is determined by the software inspection unit to not have a signature match or a potential signature match for at least a consecutive predetermined number of bytes of the connection, the connection is transitioned to the hardware-accelerated inspection mode for processing by the hardware-accelerated inspection unit, wherein if the hardware-accelerated inspection unit detects a potential signature match, the connection is transitioned back to the software inspection mode to perform deep packet inspection on the connection.

2. The system of claim 1, wherein if the software inspection unit determines the connection has a signature match, an action is taken based on the signature match.

3. The system of claim 1, wherein the hardware-accelerated inspection unit processes the connection at a faster rate than the software inspection unit.

4. The system of claim 1, wherein in the software inspection mode, the connection is processed by the hardware-accelerated inspection unit and the software inspection unit.

5. The system of claim 1, wherein in the hardware-accelerated inspection mode, the connection is processed only by the hardware-accelerated inspection unit.

6. The system of claim 1, wherein all the network traffic received by the system is processed at least by the hardware-accelerated inspection unit.

7. The system of claim 1, wherein the system is in a standalone network appliance.

8. The system of claim 1, wherein the system is incorporated into a network switch, a firewall network appliance, a converged security appliance, or a bladed chassis.

9. An intrusion prevention system (IPS) comprising:
an interface to receive network traffic in a computer network and output the network traffic toward its destination if it is determined by the IPS to not have a signature match;

a hardware-accelerated inspection unit to process a connection in the network traffic in hardware-accelerated inspection mode to determine whether the connection has a potential signature match, the hardware-accelerated unit comprising an integrated circuit that is customized to inspect the network traffic for signatures; and a software inspection unit to process the connection in software inspection mode to determine whether the connection has a signature match, the software inspection unit comprising a processor that executes instructions in memory to inspect the network traffic for signatures, wherein the software inspection unit processes the connection in the software inspection mode, and if the connection is determined to not have a signature match or a potential signature match for a consecutive predetermined number of bytes of the connection, the connection is transitioned to the hardware-accelerated inspection mode for processing by the hardware-accelerated inspection unit, wherein if the hardware-accelerated inspection unit determines the connection has a potential signature match, the connection is transitioned back to the software inspection unit to perform additional inspection on the connection.

10. The IPS of claim 9, wherein if the software inspection unit determines the connection has a signature match, the connection is blocked from being sent out of the interface.

11. The IPS of claim 9, wherein the hardware-accelerated inspection unit processes the connection at a faster rate than the software inspection unit.

12. A method of processing network traffic comprising:
receiving, on an interface of a network processing system, a connection in a network traffic in a computer network;

processing the connection in a software inspection mode for a predetermined number of bytes of the connection to determine whether the connection has a signature match;

if the connection is determined to not have a signature match or a potential signature match for the predetermined number of bytes, transitioning processing of the connection to a hardware-accelerated inspection mode, wherein connection processing in the hardware-accelerated inspection mode includes inspection of the communication using a custom integrated circuit and is faster than in the software inspection mode; and if the processing in the hardware-accelerated inspection mode determines the connection has a potential signature match, the connection processing is transitioned back to the software inspection mode.

* * * * *